(12) United States Patent
Yamaguchi et al.

(10) Patent No.: US 8,217,095 B2
(45) Date of Patent: Jul. 10, 2012

(54) ACTIVE ENERGY RAY-CURABLE INK-JET PRINTING INK

(75) Inventors: Hisao Yamaguchi, Ageo (JP); Yutaka Yamada, Saitama (JP); Naohito Saito, Sakura (JP); Osamu Oshima, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 11/666,422

(22) PCT Filed: Oct. 28, 2005

(86) PCT No.: PCT/JP2005/019902
§ 371 (c)(1),
(2), (4) Date: Apr. 27, 2007

(87) PCT Pub. No.: WO2006/046698
PCT Pub. Date: May 4, 2006

(65) Prior Publication Data
US 2007/0289484 A1    Dec. 20, 2007

(30) Foreign Application Priority Data
Oct. 29, 2004 (JP) .................... 2004-315952

(51) Int. Cl.
C09D 11/02 (2006.01)
G03F 7/028 (2006.01)
G03F 7/031 (2006.01)
C08F 2/50 (2006.01)
C08F 2/48 (2006.01)
C08F 4/00 (2006.01)

(52) U.S. Cl. ........... 522/1; 522/7; 522/8; 522/9; 522/10; 522/12; 522/14; 522/16; 522/17; 522/18; 522/21; 522/26; 522/27; 522/28; 106/31.13; 526/89; 526/193; 526/204; 526/205; 526/208

(58) Field of Classification Search .......... 522/36, 522/60, 1, 7, 8, 9, 10, 12, 14, 16, 17, 18, 522/21, 26, 27, 28; 568/336, 397, 410; 106/31.13; 529/89, 193, 204, 205, 208
See application file for complete search history.

(56) References Cited

U.S. PATENT DOCUMENTS

| 4,321,118 | A | 3/1982 | Felder et al. | |
|---|---|---|---|---|
| 6,020,528 | A * | 2/2000 | Leppard et al. | 568/15 |
| 7,482,392 | B2 * | 1/2009 | Norcini et al. | 522/42 |
| 2003/0139499 | A1 | 7/2003 | Suhadolnik et al. | |

FOREIGN PATENT DOCUMENTS

| EP | 1048700 | 11/2000 |
|---|---|---|
| JP | 1-139554 | 6/1989 |
| JP | 6-21256 | 3/1994 |
| JP | 2001-525479 | 12/2001 |
| JP | 2002-241647 | 8/2002 |
| JP | 2003-192944 A | 7/2003 |
| JP | 2004-246106 | 9/2004 |
| TW | 408136 B | 10/2000 |
| WO | WO-02-064689 | 8/2002 |
| WO | WO 03/040076 A2 | 5/2003 |
| WO | WO-03-046017 | 6/2003 |
| WO | WO 2004/009651 A1 | 1/2004 |
| WO | WO 2004/092287 A1 | 10/2004 |
| WO | WO-2004-099302 | 11/2004 |
| WO | WO-2005/008299 A1 | 1/2005 |

OTHER PUBLICATIONS

Ciba Photoinitiators for UV Curing Key Product Selection Guide; Oct. 2003; Switzerland; 8 pages.*
Office Action dated Dec. 30, 2011, issued for Taiwanese patent application No. 094137809.
Office Action dated May 6, 2011, issued for Japanese patent application No. 2005-102073.
Notice of Allowance dated May 6, 2011, issued for Japanese patent application No. 2005- 102074.

* cited by examiner

Primary Examiner — Mark Eashoo
Assistant Examiner — Michael Pepitone
(74) Attorney, Agent, or Firm — Edwards Wildman Palmer LLP

(57) ABSTRACT

The object of the present invention is to provide an active energy ray-curable ink-jet printing ink, including: a coloring agent; a compound having an ethylenic double bond; and a photo-polymerization initiator, wherein the photo-polymerization initiator includes a compound represented by general formula (1):

(1)

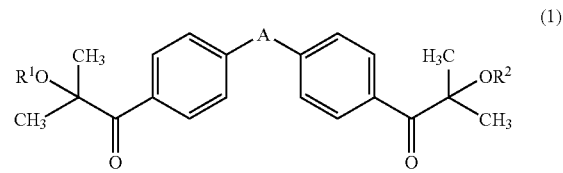

(wherein A represents any one of —O—, —CH$_2$—, —CH(CH$_3$)—, and —C(CH$_3$)$_2$—; and each of R$^1$ and R$^2$ independently represents a hydrogen atom, a methyl group, or a trimethylsilyl group), and an α-aminoketone-based compound and/or an acyl phosphine oxide-based compound, and 40% by mass or more of the compound represented by general formula (1) is included with respect to the total photopolymerization initiator.

5 Claims, No Drawings

ACTIVE ENERGY RAY-CURABLE INK-JET PRINTING INK

CROSS-REFERENCE TO RELATED APPLICATIONS

This application is a 371 National Stage Application of PCT/JP05/19902, filed on Oct. 28, 2005 and claims the benefit of Japanese Patent Application No. 2004-315952, filed Oct. 29, 2004.

TECHNICAL FIELD

The present invention relates to an ink-jet printing ink, wherein an active energy ray-curable ink composition is discharged as minute droplets, and the droplets are cured through irradiation of active energy rays such as ultraviolet rays and electron rays, thereby conducting image formation.

BACKGROUND ART

Ink-jet printing is a system in which the ink is discharged from a nozzle and adhered to a printing material. This printing system can achieve excellent printing even on a curved, uneven or irregular surface because the nozzle is not in contact with the printing material. Accordingly, it has been expected that such a printing system would be applied to various fields.

In recent years, with regard to inks used in the ink-jet printing system, aqueous inks including water as a main component, oil-based inks including an organic solvent as a main component, and active energy ray-curable inks including a main component of a compound curable with active energy ray irradiation such as ultraviolet- or electron ray-irradiation have been provided. Especially, such an active energy ray-curable ink has been emphasized in certain fields of industry in terms of properties such as water-resistance, solvent-resistance and abrasion-resistance, or characteristics in which the ink can be applied to ink-nonabsorbable materials such as glass, metal, and plastics. Furthermore, among the active energy ray-curable inks, non-solvent ink substantially including no organic solvents has been best favored because such ink includes no volatile components, the drying step is therefore unnecessary, and is free from hazardous volatile organic components.

With regard to active energy ray-curable ink-jet printing inks that are colored with pigments or dyes, various compounds such as α-aminoketone-based, acyl phosphine oxide-based, hydroxyketone-based or thioxanthone-based compounds have been used as a photo-polymerization initiator in order to alleviate the cure-inhibiting phenomenon caused from the blockage of the active energy ray with the pigments incorporated therein. In particular, photo-polymerization initiators having an optical-absorption property of relatively longer wavelength are used therein. Even if the printed coating film is much thick, the use of such photo-polymerization initiators can alleviate the blockage problems caused from the reflection, absorption or the like of the active energy rays owing to the pigment incorporated therein, thereby achieve a deep curing of the printed coating film (See Patent Documents 1 and 2). In addition, the combination thereof has been alternatively employed (See Patent Documents 2 and 3).

However, most of the commercially available radical photo-polymerization initiators have a problem in which the generated radicals are trapped by oxygen in the air whereby the inhibition of the polymerization reaction is likely to occur. Therefore, there has been a demerit the curability is reduced particularly in a thin film regardless of the use thereof for the inks.

With regard to conventional printers employing flat printing, flexographic printing or the like, a low-concentration portion and high-concentration portion of a full-color print to a non-absorbable material are expressed with areas of the printed dots, and no large difference in the thickness of the printed coat is present. On the contrary, with regard to the image formation in the ink-jet printing system, the density of color is controlled with the size of the droplet and the dot density, the thickness of the printed coat varies depending on the density of color, and the difference of the thickness between the low-concentration portion and high-concentration portion is larger. In particular, the difference of the thickness becomes larger when an ink including no unreactive organic solvent is used. Therefore, the ink coat in the portion of light color is thin in thickness, intervals between the dots tend to be wide, and the most of the ink portions adhered onto the printed surface is in contact with the air, and therefore, such portions are subjected to the phenomenon of inhibiting a polymerization owing to oxygen. Consequently, the formed image often has portions that are deficiently cured, and the occurrence of nonuniform curing is inevitable in a general image having a distribution of color density.

Furthermore, among commercially available photo-polymerization initiators, easily obtainable α-aminoketone-based or acyl phosphine oxide-based photo-polymerization initiators have low solubility with respect to compounds having ethylenic double bonds, which make it possible to attain the active energy ray-curability. Therefore, particularly in a solventless ink, such a photo-polymerization initiator causes precipitation therein when the amount of the initiator incorporated therein is increased in order to improve the curability, the nozzle is then clogged with the precipitation, and this interferes with the discharging of the ink.

Therefore, the shortage of the curability cannot be improved by increasing the amount of the initiator added thereto, and the conventional active energy ray-curable ink-jet printing inks cannot achieve curability sufficient for practical use especially when the coating film is thin in thickness.

In addition, white inks in which a white pigment such as titanium oxide is used as a coloring agent necessitate a much higher concentration of the coloring agent compared with the other colors in order to obtain sufficient concealment, and the effect of the concealment owing to the coloring agent significantly increases, thereby further deteriorating the curability. For example, when the large amount of a photo-polymerization initiator having an optical absorption in a range of the longer wavelengths is used therein, there has been a problem in which the cured product turns yellow.

On the other hand, an α-hydroxyketone-based photo-polymerization initiator which does not have an optical absorption in a range of the longer wavelengths as the above-described photo-polymerization initiator has, does not cause the yellow-coloring problem, and has excellent curability, has been disclosed (See Patent Documents 4 to 6).

However, when the photo-polymerization initiators disclosed in these documents are singularly used in an active energy ray-curable ink-jet printing ink, sufficient curability cannot be obtained particularly in curing a thin film. Thus, a photo-polymerization initiator which can impart sufficient curability to the formed coating film has been long expected.

The reason such a photo-polymerization initiator could not be achieved is because the curability has been conventionally confirmed by often using a coating film about 10 μm thick, and a photo-polymerization initiator has not been developed by studying its chemical composition and combination so as to simultaneously impart curability to coating films in a wide range of thickness, having a thickness of several micrometers or much larger thickness.

Patent Document 1: Japanese Examined Patent Application, Publication No. H6-21256

Patent Document 2: Japanese Unexamined Patent Application, Publication No. 2001-525479 (Japanese translation of PCT international application)

Patent Document 3: Japanese Unexamined Patent Application, Publication No. 2002-241647

Patent Document 4: PCT International Publication No. WO 03/040076

Patent Document 5: PCT International Publication No. WO 2004/009651

Patent Document 6: PCT International Publication No. WO 2004/092287

DISCLOSURE OF INVENTION

An object of the present invention is to provide an active energy ray-curable ink-jet printing ink which can improve the above-described demerits in the conventional active energy ray-curable ink-jet printing ink, and which can exhibit curability sufficient for practical use in either thin or thick films formed by way of the ink-jet printing method, thereby causing nonuniform curing.

The present inventor studied a photo-polymerization initiator which has excellent curability in an entire range of thickness corresponding to an actual image formed by way of the ink-jet printing method (several micrometers thick to much thicker), and can solve the above-described problems. Consequently, the inventor discovered that use of a specific combination of initiators can effectively improve the curability of the ink regardless of a thin or thick film, and this resulted in the present invention.

That is, an aspect of the present invention is to provide an active energy ray-curable ink-jet printing ink, including a coloring agent, a compound having ethylenic double bonds, and a photo-polymerization initiator, wherein the photo-polymerization initiator includes those represented by the general formula (1):

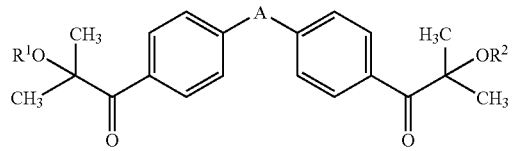

(wherein A represents any one of —O—, —CH$_2$—, —CH(CH$_3$)—, and —C(CH$_3$)$_2$—; and each of R$^1$ and R$^2$ independently represents a hydrogen atom, a methyl group, or a trimethylsilyl group), and an α-aminoketone-based compound and/or an acyl phosphine oxide-based compound, and the compound represented by the general formula (1) is included in 40% by mass or more with respect to the total photo-polymerization initiator.

The active energy ray-curable ink-jet printing ink of the present invention uses the compound represented by the general formula (1), which prevents the polymerization-inhibiting phenomenon owing to oxygen, further uses an α-aminoketone-based or an acyl phosphine oxide-based photo-polymerization initiator in combination, and therefore, the curability is improved in a thin coating film formed by way of an ink-jet printing method. Moreover, the α-aminoketone-based or an acyl phosphine oxide-based photo-polymerization initiator can impart excellent curability to a thick film formed by way of the ink-jet printing method, and the use of these initiators in combination can achieve superior curability in either thin or thick films. Furthermore, 40% by mass or more of the compound represented by the general formula (1) which has no optical absorption in the long wavelength range is used therein, thereby controlling the use of the other photo-polymerization initiator having optical absorption in the long wavelength range. Then, this can prevent the cured coating film from yellowing because the absorption of light having wavelength of the visible range is controlled. As a result, the inherent color development of the ink does not change, and when a white pigment, whose color development is likely to be affected, is particularly used therein, the effect to prevent it from yellowing is significant and preferable.

In addition, "(meth)acrylate" means either methacrylate or acrylate, or both of them.

The active energy ray-curable ink-jet printing ink of the present invention exhibits excellent curability for practical use regardless of whether the coating film formed by an ink-jet printing method is thin or thick, and never causes insufficient or nonuniform curing of the coating film.

BEST MODE FOR CARRYING OUT THE INVENTION

Hereinafter, the present invention is further described in detail.

In the present invention, one of the photo-polymerization initiators used in combination is represented by the general formula (1):

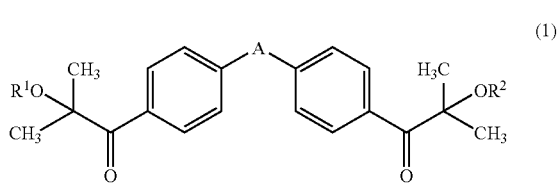

(wherein A represents any one of —O—, —CH$_2$—, —CH(CH$_3$)—, and —C(CH$_3$)$_2$—; and each of R$^1$ and R$^2$ independently represents a hydrogen atom, a methyl group, or a trimethylsilyl group).

In the general formula (1), it is preferable that A be —O—, —CH$_2$—, or —CH(CH$_3$)—, and that R be a methyl group.

The general formula (1) includes a photo-polymerization initiator classified as α-hydroxyketone-based, which has no optical absorbance in the long wavelength range, compared with α-aminoketone-based or acyl phosphine oxide-based photo-polymerization initiators, and the coating film is not colored after curing. However, its structure has been considered as disadvantageous to curability in a system where a coloring agent is incorporated.

Actually, 1-hydroxycyclohexylphenylketone (a commercial product "IRGACURE® 184" produced by Ciba Specialty Chemicals) or 2-hydroxy-2-methyl-1-phenylpropane-1-one (a commercial product "DAROCUR® 1173" produced by Ciba Specialty Chemicals) is available as an α-hydroxyketone-based photo-polymerization initiator, but, in fact, sufficient curability cannot be obtained, particularly in a thin film.

However, the use of a photo-polymerization initiator represented by the general formula (1) can control the polymerization-inhibiting phenomenon owing to the oxygen exposure, although the reason is not apparent.

In particular, among the compounds of the general formula (1), 2-hydroxy-1-{4-[4-(2-hydroxy-2-methylpropyonyl)benzyl]phenyl}-2-methylpropane-1-one is preferable because it is unlikely to have the polymerization-inhibiting phenomenon owing to oxygen exposure. This compound is represented by the general formula (2):

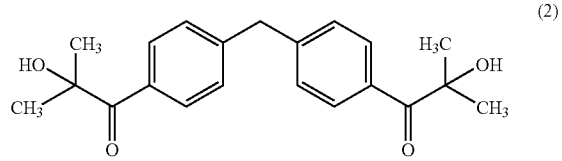

(2)

In addition, this compound is also easily available as a commercial product "IRGACURE® 127" produced by Ciba Specialty Chemicals.

The solubility of the photo-polymerization initiator of general formula (2) in the UV-curable compounds described below is not very high, but the surface-curability is particularly excellent, and the initiator is odorless and colorless, and a large amount of the initiator can be incorporated by increasing the amount to the extent that it does not deteriorate its solubility.

The mixing ratio of general formulas (1) and (2) is 40% by mass or more with respect to the total amount of the photo-polymerization initiators, but 50% by mass or more is more preferable. The maximum range can be preferably set to 90% by mass, and more preferably 80% by mass. When 40% by mass or more of the compounds are incorporated therein, the curability of the thin coating film is excellent, and the occurrence of nonuniform curing can be prevented in an image formed by the ink-jet printing method.

In the present invention, the photo-polymerization initiator used in combination with the photo-polymerization initiator of the general formula (1) in order to obtain more sufficient curability with the irradiation of active energy rays in various coating films varying with the cured thickness is an α-aminoketone-based or acyl phosphine oxide-based photo-polymerization initiator.

The amount of the α-aminoketone-based or acyl phosphine oxide-based photo-polymerization initiator is 60% by mass or less with respect to the total amount of photo-polymerization initiators incorporated therein, and preferably 50% by mass or less. The minimum amount is preferably set to 10% by mass, and more preferably 20% by mass. The total amount of the photo-polymerization initiators is 5% by mass to 15% by mass with respect to the total amount of all ink components. It is preferable that the amount of the α-aminoketone-based or acyl phosphine oxide-based photo-polymerization initiator be 10% by mass or more because the curability is excellent in either a thin or thick film. When the amount of the α-aminoketone-based or acyl phosphine oxide-based photo-polymerization initiator is 60% by mass or less, the curability in a thin film can be made favorable by using 40% by mass or more of a colorless and odorless photo-polymerization initiator represented by general formula (1) such as "IRGACURE® 127". Then, a composition of the photo-polymerization initiators can be easily obtained, which can suppress yellowing in a cured coating film by way of the ink-jet printing method.

Furthermore, a three species-mixed system is preferable, in which the α-aminoketone-based initiator and acyl phosphine oxide-based photo-polymerization initiator are incorporated, because the curability in both a thin and thick coating film formed by way of the ink-jet printing method is further improved. In this case, the total amount of the α-aminoketone-based photo-polymerization initiator and acyl phosphine oxide-based photo-polymerization initiator is also 60% by mass or less with respect to the amount of all photo-polymerization intiators, and more preferably 50% by mass or less. Also, it is preferable that the amount of all the photo-polymerization initiators be 5% by mass to 15% by mass with respect to the mass of all components of the active energy ray-curable ink-jet printing ink. Particularly, it is preferable that 40%-90% by mass of the compound represented by the general formula (1), 5%-20% by mass of the above-described acyl phosphine oxide-based compound, and 5%-30% by mass of the above-described α-aminoketone-based compound be included in the above-described three species-mixed system of the photo-polymerization initiators. It is more preferable that 50%-90% by mass of the compound represented by the general formula (1), 5%-20% by mass of the above-described acyl phosphine oxide-based compound, and 5%-30% by mass of the above-described α-aminoketone-based compound be included therein. It is most preferable that 50%-80% by mass of the compound represented by the general formula (1), 10%-20% by mass of the above-described acyl phosphine oxide-based compound, and 10%-30% by mass of the above-described α-aminoketone-based compound be incorporated therein.

The α-aminoketone-based photo-polymerization initiator used in the present invention has a chemical structure represented by the general formula (3):

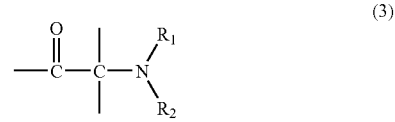

(3)

(wherein $R^1$ and $R^2$ represent a hydrogen atom, a $C_1$-$C_5$ alkyl group, or a saturated or unsaturated hetero-atom-containing hydrocarbon group where $R^1$ and $R^2$ are united to form a heterocyclic ring). In particular, the photo-polymerization initiator represented by the general formula (4):

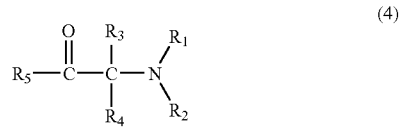

(4)

(wherein $R^1$ and $R^2$ represent a hydrogen atom, a $C_1$-$C_5$ alkyl group, or a saturated or unsaturated hetero-atom-containing hydrocarbon group where $R^1$ and $R^2$ are united to form a heterocyclic ring; $R^3$ and $R^4$ represent a C1-C5 alkyl group, or an aromatic hydrocarbon group which may have a substituted group of a methyl or ethyl group; and $R^5$ represents an aromatic hydrocarbon group which may have a substituted group) is preferable.

As an example of the α-aminoketone-based photo-polymerization initiator, 2-methyl-1-[4-(methylthio)phenyl]-2-morpholinopropane-1-one (a commercial product "IRGACURE® 907" produced by Ciba Specialty Chemicals) represented by the general formula (5):

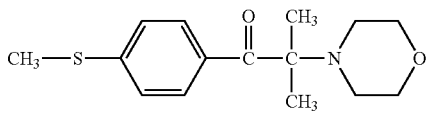
(5)

or 2-benzyl-2-dimethylamino-1-(4-morpholinophenyl)butane-1-one (a commercial product "IRGACURE® 369" produced by Ciba Specialty Chemicals) represented by the general formula (6):

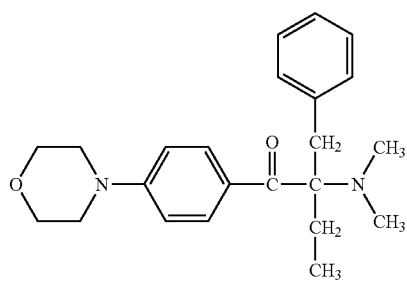
(6)

can be mentioned. Considering that the photo-polymerization of the general formula (5) causes no yellow-coloring even if the amount added is increased, the use of this compound is more preferable. On the other hand, the solubility of the photo-polymerization initiator of the general formula (6) is not very high with respect to ultraviolet-curable compositions, but the initiator is preferable in terms of having no odor. These can be used appropriately for each purpose.

It is preferable that the acyl phosphine oxide-based photo-polymerization initiators have a chemical structure represented by the formula (7):

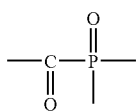
(7)

or a chemical structure represented by the formula (8):

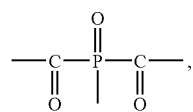
(8)

and, it is more preferable that the compounds have a chemical structure represented by the formula (9):

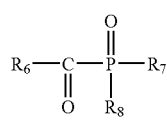
(9)

(wherein $R_6$, $R_7$ and $R_8$ represent an aromatic hydrocarbon group which may have a methyl group or an ethyl group as a substituted group), or a chemical structure represented by the formula (10):

$$R_9-\overset{O}{\underset{\|}{C}}-\overset{O}{\underset{\|}{\underset{R_{11}}{P}}}-\overset{O}{\underset{\|}{C}}-R_{10}$$
(10)

(wherein $R_9$, $R_{10}$ and $R_{11}$ represent an aromatic hydrocarbon group which may have a methyl group or an ethyl group as a substituted group).

Examples of the acyl phosphine oxide-based photo-polymerization initiators include bis(2,4,6-trimethylbenzoyl)phenylphosphine oxide (a commercial product "IRGACURE® 819" produced by Ciba Specialty Chemicals) represented by the formula (11):

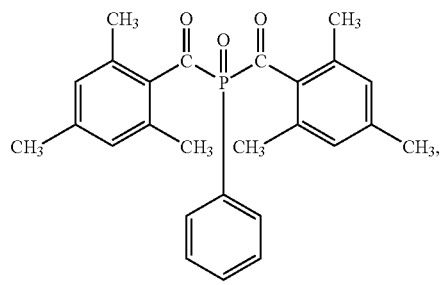
(11)

or 2,4,6-trimethylbenzoyl diphenylphosphine oxide (a commercial product "Lucirin TPO" produced by BASF) represented by the formula (12):

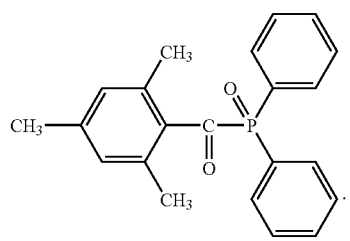
(12)

The photo-polymerization initiator of the formula (11) is more preferable in terms of its curability. The photo-polymerization initiator of the formula (12) is more preferable in terms of its solubility with respect to the ultraviolet-curable compositions.

1-hydroxy-cyclohexyl-phenyl-ketone (a commercial product "IRGACURE® 184" produced by Ciba Specialty Chemicals), which is a photo-polymerization initiator used in the present invention, is represented by the formula (13) presented below.

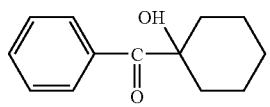
(13)

The mixing amount of this compound is not strictly limited because it has high solubility in the ultraviolet-curable compounds, and because it causes no coloring in the cured product. However, an excessive amount cannot be used because the compound is moderately odorous. When an active energy ray-curable ink-jet printing ink is produced by combining a specific amount of the photo-polymerization initiator of the general formula (1) with an α-aminoketone-based or acyl phosphine oxide-based photo-polymerization initiator, a photo-polymerization initiator of the general formula (1) whose solubility is not high (for example, "IRGACURE® 127") is supplemented thereto, and the compound of the formula (13) can be further added in order to improve curability of the thin film. It is effective that the addition is conducted at 10% or more by mass with respect to the total amount of all photo-polymerization initiators, and 10% to 40% by mass of the addition is preferable in particular. In particular, because the curability of the thin film can be improved, the compound of the formula (13) is preferably used for certain types of ink-jet printers. Such an ink-jet printer has a printing system where an adjoining print head and UV lamp scan through a printing material, forming a thin coating film by ejecting each color of ink, subsequently curing the film after each ejection by way of the UV irradiation, and form an image by layering the thin film while repeating this process.

The larger the total mixing amount of these photo-polymerization initiators is, the better the curability improves in general. However, the use of an excessive amount increases the viscosity of the ink, and deteriorates the storage stability at low temperature. If the photo-polymerization initiator has excellent solubility, and hardly causes the increase of the viscosity and the deterioration of the storage stability, then an excessive amount may be blended. However, there is a problem in which unreacted photo-polymerization initiators, and degradation products of the photo-polymerization initiators increase the odor of the cured coating film, and deteriorate the strength of the cured coating film. Therefore, it is preferable that 5% to 15% by mass of the photo-polymerization initiators be included in the ink in order to improve the curability. Furthermore, 7% to 12% by mass is more preferable in order to achieve excellent curability while not adversely affecting physical properties of the cured coating film of the ink-jet printing ink.

In the active energy ray-curable ink-jet printing ink of the present invention, each of the photo-polymerization initiators is blended in the ranges as described above, but the total amount of the photo-polymerization initiators is not particularly limited. In general, the photo-polymerization initiators are appropriately added in the above-described range, which is considered to not adversely affect the physical properties of the cured coating film. However, each photo-polymerization initiator has inherent properties in terms of solubility in a UV-curable composition, odor, color or the like, and therefore, it is preferable that the appropriate types be combined, and that their amounts be appropriately adjusted for their intended use within the above-described blending ranges.

The active energy ray-curable ink-jet printing ink of the present invention includes at least a coloring agent and a compound having an ethylenic double-bond in addition to the above-described photo-polymerization initiators. However, the ink can further contain an additive such as a photosensitizer for improving the curability, a leveling agent for adjusting surface tension, and a coupling agent for improving adhesiveness to a base material.

Dyes and pigments conventionally used for ink-jet printing inks can be used as coloring agents in the present invention. The dyes include, for example, an azo dye, phthalocyanine dye, anthraquinone dye. The pigments include, for example, azo pigments such as an azo lake pigment, insoluble azo pigment, condensed azo pigment, and chelate azo pigment; polycyclic pigments such as a phthalocyanine pigment, anthraquinone pigment, perylene pigment, quinacridone pigment, isoindoline pigment, thioindigo pigment, dioxazine pigment, and quinophthalone pigment; lake pigments such as a basic or acidic lake pigment; organic pigments such as a nitro pigment, nitroso pigment, aniline black, and daylight fluorescent pigment; and inorganic pigments such as titanium oxide, iron oxide, and carbon black-based pigment. These dyes and pigments may be used in combination. However, the use of such pigments is preferable in terms of light resistance. The coloring agent is used within a range of 0.1% to 20% by mass, preferably 2% to 6% by mass with respect to the total amount of the ink.

In addition, inorganic pigments such as titanium oxide, antimony oxide, aluminum oxide, magnesium oxide, silicone dioxide, and zinc sulfate, which have excellent concealment property, are preferably used as white pigments. The white pigments are often used in a high concentration to attain sufficient concealment, and these pigments intercept a part of the active energy rays, and therefore, they are likely to cause insufficient curing of the coating film formed by way of the ink-jet printing method. Moreover, when the amount of the photo-polymerization initiators is increased in order to improve the curability, there is a problem in which some photo-polymerization initiators cause yellowing of the cured coating film, and this coloring would be more conspicuous in the white coating film. Therefore, it is more important to select a photo-polymerization initiator having excellent curability.

With regard to the compound having an ethylenic double-bond, (meth)acrylates are preferably used because they have a favorable curing speed, and they are easily available in many different types and cost-effective. The (meth)acrylates include monofunctional or polyfunctional (meth)acrylates. These can be used alone or in combination of two or more types at a given ratio.

The monofunctional (meth)acrylates used in the present invention include (meth)acrylates or the like having a substituted group such as methyl, ethyl, propyl, butyl, 3-methoxybutyl, amyl, isoamyl, 2-ethylhexyl, octyl, isooctyl, nonyl, isononyl, decyl, isodecyl, dodecyl, tridecyl, hexadecyl, octadecyl, stearyl, isostearyl, cyclohexyl, benzyl, methoxyethyl, butoxyethyl, phenoxyethyl, nonylphenoxyethyl, glycidyl, dimethylaminoetyl, diethylaminoethyl, isobornyl, dicyclopentanyl, dicyclopentenyl, and dicyclopentenyloxyethyl.

It is preferable that 20% by mass or less of the compound having one ethylenic double-bond be included with respect to the total amount of the photo-polymerization compounds.

The polyfunctional (meth)acrylates include, for example, di(meth)acrylates of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecanedimethanol, ethylene glycol, polyethylene glycol, propylene glycol, dipropylene glycol, tripropylene glycol and polypropylene glycol; a di(meth)acrylate of tris(2-hydroxyethyl)isocyanurate; a di(meth)acrylate of a diol obtained by adding 2 moles or more of ethylene oxide or propylene oxide to 1 mole of 1,6-hexanediol; a di(meth)acrylate of a diol obtained by adding 4 moles or more of ethylene oxide or propylene oxide to 1 mole of neopentyl glycol; a di(meth) acrylate of a diol obtained by adding 2 moles of ethylene oxide or propylene oxide to 1 mole of bisphenol A; a di- or tri-(meth)acrylate of a triol obtained by adding 3 moles or more of ethylene oxide or propylene oxide to 1 mole of trimethylolpropane; a di(meth)acrylate of a diol obtained by adding 4 moles or more of ethylene oxide or propylene oxide to 1 mole of bisphenol A; trimethylolpropane tri(meth)acrylate; pentaerythritol tri(meth)acrylate; pentaerythritol tetra (meth)acrylate; dipentaerythritol poly(meth)acrylates; ethylene oxide-modified phosphoric acid (meth)acrylates; and ethylene oxide-modified alkylphosphoric acid (meth)acrylates.

In addition to the above-mentioned (meth)acrylates, functional oligomers having an ethylenic double-bond such as urethane (meth)acrylate oligomers and epoxy(meth)acrylate oligomers can be further added where necessary. It is preferable that the (meth)acrylate oligomers be used within a range of 2% to 20% by mass with respect to the total amount of the photo-polymerization initiators because they have high viscosity compared with monomers.

In order to form an active energy ray-curable composition that has a favorable discharging-property and excellent curability, and that imparts a high strength to the coating film in the ink-jet printing method, the above-mentioned monofunctional acrylates, bifunctional acrylates, trifunctional or polyfunctional acrylates, oligomers, and the like are suitably selected and combined by way of balancing their properties.

As the sensitizers used in the present invention, amines that do not undergo an addition reaction with the above-mentioned polymerizable components (for example, trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone) can be used in combination. The sensitizers described above are preferably selected from those which display excellent solubility in a compound having an ethylenic double-bond, and which do not inhibit the transmittance of the active energy rays.

A dispersant can also be used where necessary so as to improve the dispersibility of the coloring agent. In this case, it is desirable that the dispersant be used at an optimal mixing ratio which is determined depending on the types of the coloring agent and dispersant used therein.

The dispersants used in the present invention include commercially available dispersants used for dispersing a pigment. In particular, polymer dispersants are preferable, and polymer dispersants which do not substantially have a volatile organic solvent are more preferable. For example, the "Solsperse" series produced by the Lubrizol Corporation, "Ajisper" series produced by Ajinomoto Fine-Techno. Co. Inc., "BYK" series produced by BYK-Chemie can be mentioned. Furthermore, a derivative of a pigment can also be used as a dispersion assistant where necessary. Examples of commercially available dispersion assistants include "Solsperse 5000", "Solsperse 12000", and "Solsperse 22000" produced by the Lubrizol Corporation. However, it is not limited to these dispersion assistants.

The composition of the present invention can further use a non-reactive organic solvent in order to adjust the viscosity or the like. Up to 70% by mass of the organic solvent can be used with respect to the total amount of the photo-polymerization initiators. However, the preferable amount is 50% by mass or less. The ink composition of the present invention can be used in a solvent-free form as long as there is no problem in terms of its viscosity or the like, and it is preferable that it does not substantially contain solvents for dilution. That is, when containing no solvents for dilution, the composition can exhibit excellent characteristics in that a drying process of the solvent is not required; it is free from the deterioration of solvent resistance or abrasion resistance caused from the remaining solvent that decreases the density of the three-dimensional network structure of the cured coating film or that prevents the polymerization; and there is no concern over the hazardous effect to humans owing to the gradual volatilization of the remaining solvent. On the contrary, in some instances, additives such as dispersants are added in the form of organic solvent solutions to the ink composition, and the content of the solvent may reach several percent by mass. However, these solvents are different from the solvents for diluting the active energy ray-curable ink-jet printing ink, and their amounts are also small, and therefore, the above-described problems do not occur.

The active energy ray-curable ink-jet printing ink of the present invention can be prepared by way of stirring and mixing a high-concentration coloring agent-dispersing solution which is obtained by mixing the appropriate amounts of the coloring agent, additives, and the like into a part of the compound having an ethylenic double-bond, and by kneading them; and a diluted solution which is obtained by stirring and dissolving a photo-polymerization initiator in the remaining compound having a ethylenic double-bond.

The kneading can be conducted by using a dispersing device such as a paint shaker, ball mill, closed-type horizontal bead mill (for example, "SC mill"), open-type vertical mill (for example, "Dispermat").

EXAMPLES

Hereinafter, the present invention is further described in details with reference to Examples. However, the present invention is not limited to the following Examples. In addition, "part" means "part by mass" in Examples.
(Preparation of Ink)

The inks used in Examples and Comparative Examples were prepared by way of the method described below.

With regard to dispersants for each ink of yellow, magenta, cyan and black, a dispersant solution prepared by dissolving 30% by mass of a polymer dispersant (a commercial product "Ajisper PB821" produced by Ajinomoto Fine-Techno. Co. Inc.) in 2-hydroxy-3-phenoxypropyl acrylate (a commercial product "Aronix M-5700" produced by Toagosei Co., Ltd.) was used.

As a dispersant for a white ink, a dispersant solution prepared by dissolving 30% by mass of a polymer dispersant (a commercial product "Solsperse 24000GR" produced by the Lubrizol Corporation) in 2-hydroxy-3-phenoxypropyl acrylate (a commercial product "Aronix M-5700" produced by Toagosei Co., Ltd.) was used.
[Preparation of High-Concentration Pigment-Dispersing Solution]
(a. Preparation of Yellow Pigment-Dispersing Solution)
Zirconia beads having a diameter of 1 mm: 80 parts
Yellow pigment: 4 parts
(Commercial Product "Novoperm Yellow P-HG" Produced by Clariant)
Polymer dispersant solution: 4 parts
(a solution in which 30% by mass of a polymer dispersant (a commercial product "Ajisper PB821" produced by Ajinomoto Fine-Techno. Co. Inc.) was dissolved in 2-hydroxy-3- phenoxypropyl acrylate (a commercial product "Aronix M-5700" produced by Toagosei Co., Ltd.))
Dipropylene glycol diacrylate: 32 parts
(commercial product "Miramer M-222" produced by Miwon Commercial Co., Ltd.)

The above-described materials were transferred into a plastic bottle, and treated with a paint shaker for two hours. Then, the zirconia beads were removed with a nylon mesh, thereby preparing a high-concentration pigment-dispersing solution of a yellow pigment.

(b. Preparation of Magenta Pigment-Dispersing Solution)
Zirconia beads having a diameter of 1 mm: 80 parts
Magenta pigment: 4 parts
(Commercial product "Fastgen Surer Magenta RTS" produced by Dainippon Ink and Chemicals, Inc.)
Polymer dispersant solution: 6 parts
(a solution in which 30% by mass of a polymer dispersant (a commercial product "Ajisper PB821" produced by Ajinomoto Fine-Techno. Co. Inc.) was dissolved in 2-hydroxy-3-phenoxypropyl acrylate (a commercial product "Aronix M-5700" produced by Toagosei Co., Ltd.))
Dipropylene glycol diacrylate: 30 parts The above-described materials were transferred into a plastic bottle, and treated with a paint shaker for two hours. Then, the zirconia beads were removed with a nylon mesh, thereby preparing a high-concentration pigment-dispersing solution of a magenta pigment.

(c. Preparation of Cyan Pigment-Dispersing Solution)
Zirconia beads having a diameter of 1 mm: 80 parts
Cyan pigment: 4 parts
(Commercial product "Fastgen Surer Blue 5412SD" produced by Dainippon Ink and Chemicals, Inc.)
Polymer dispersant solution: 4 parts
(a solution in which 30% by mass of a polymer dispersant (a commercial product "Ajisper PB821" produced by Ajinomoto Fine-Techno. Co. Inc.) was dissolved in 2-hydroxy-3-phenoxypropyl acrylate (a commercial product "Aronix M-5700" produced by Toagosei Co., Ltd.))
Dipropylene glycol diacrylate: 32 parts The above-described materials were transferred into a plastic bottle, and treated with a paint shaker for two hours. Then, the zirconia beads were removed with a nylon mesh, thereby preparing a high-concentration pigment-dispersing solution of a cyan pigment.

(d. Preparation of Black Pigment-dispersing Solution)
Zirconia beads having a diameter of 1 mm: 80 parts
Black pigment: 4 parts
(a carbon black "#960" produced by Mitsubishi Chemical Corporation)
Polymer dispersion assistant ("Solsperse 5000" produced by the Lubrizol Corporation): 0.4 parts
Polymer dispersant solution: 8 parts
(a solution in which 30% by mass of a polymer dispersant (a commercial product "Ajisper PB821" produced by Ajinomoto Fine-Techno. Co. Inc.) was dissolved in 2-hydroxy-3-phenoxypropyl acrylate (a commercial product "Aronix M-5700" produced by Toagosei Co., Ltd.))
Dipropylene glycol diacrylate: 28 parts The above-described materials were transferred into a plastic bottle, and treated with a paint shaker for two hours. Then, the zirconia beads were removed with a nylon mesh, thereby preparing a high-concentration pigment-dispersing solution of a black pigment.

(e. Preparation of White Pigment-Dispersing Solution)
Zirconia beads having a diameter of 1 mm: 80 parts
White pigment (titanium oxide "JR-806" produced by Tayca Corporation): 16 parts
Polymer dispersant solution: 2.8 parts
(a solution in which 30% by mass of a polymer dispersant (a commercial product "Solsperse 24000GR" produced by the Lubrizol Corporation) was dissolved in 2-hydroxy-3-phenoxypropyl acrylate (a commercial product "Aronix M-5700" produced by Toagosei Co., Ltd.))
Dipropylene glycol diacrylate: 21.2 parts The above-described materials were transferred into a plastic bottle, and treated with a paint shaker for two hours. Then, the zirconia beads were removed with a nylon mesh, thereby preparing a high-concentration pigment-dispersing solution of a white pigment.

Example 1

Preparation of Diluted Reactive Monomer Composition

Pentaerythritol tetraacrylate: 5 parts
(commercial product "Aronix M-450" produced by Toagosei Co., Ltd.)
Ethoxylated (3 moles) trimethylolpropane triacrylate: 10 parts
(commercial product "Aronix M-350" produced by Toagosei Co., Ltd.)
Dipropylene glycol diacrylate: 33 parts
(commercial product "Miramer M-222" produced by Miwon Commercial Co., Ltd.)
Isooctyl acrylate: 12 parts
(commercial product "IOAA" produced by Osaka Chemical Industry Ltd.)
Modified silicone oil (commercial product "KF-351A" produced by Shin-Etsu Chemical Co., Ltd.): 0.2 parts
"IRGACURE® 127": 6 parts
(a photo-polymerization initiator produced by Ciba Specialty Chemicals)
"IRGACURE® 907": 4 parts
(an α-aminoketone-based photo-polymerization initiator produced by Ciba Specialty Chemicals)

The above-described materials were transferred into a plastic bottle, and the photo-polymerization initiators were dissolved by heating to 60° C., stirred and mixed, thereby preparing a diluted reactive monomer composition.

(Preparation of Ink)

40 parts of the above-prepared high-concentration pigment-dispersing solution of a yellow (Y), magenta (M), cyan (C), black (B), or white (W) pigment, and 70.2 parts of the above-obtained diluted reactive monomer composition were mixed by way of stirring, thereby preparing a yellow ink, magenta ink, cyan ink, black ink, and white ink, respectively, that had the composition of the photo-polymerization initiators of Example 1.

Examples 2 to 7 and Comparative Examples 1 to 11

In the Examples and Comparative Examples, the inks of each color were prepared as the same manner as in Example 1 except that the compositions and the amount of the photo-polymerization initiators in Table 1 or 2 were applied.

TABLE 1

Amounts of the photo-polymerization initiators used

| | | Photo-polymerization initiator of the general formula (1) | α-Aminoketone-based photo-polymerization initiator | Acyl phosphine oxide-based photo-polymerization initiator | Other photo-polymerization initiators |
|---|---|---|---|---|---|
| Example | 1 | 6 (Irg. 127) | 4 (Irg. 907) | | |
| | 2 | 6 (Irg. 127) | 4 (Irg. 369) | | |
| | 3 | 8 (Irg. 127) | | 2 (Irg. 819) | |
| | 4 | 8 (Irg. 127) | | 2 (Luc. TPO) | |
| | 5 | 5 (Irg. 127) | | 5 (Luc. TPO) | |
| | 6 | 8 (Irg. 127) | 1 (Irg. 907) | 3 (Luc. TPO) | |
| | 7 | 9 (Irg. 127) | 1 (Irg. 907) | 2 (Irg. 819) | |

TABLE 2

Amounts of the photo-polymerization initiators used

| | | Photo-polymerization initiator of the general formula (1) | α-Aminoketone-based photo-polymerization initiator | Acyl phosphine oxide-based photo-polymerization initiator | Other photo-polymerization initiators |
|---|---|---|---|---|---|
| Comparative Example | 1 | 12 (Irg. 127) | | | |
| | 2 | 3 (Irg. 127) | 7 (Irg. 907) | | |
| | 3 | 3 (Irg. 127) | | 7 (Luc. TPO) | |
| | 4 | 8 (Irg. 127) | | | 2 (Irg. 651) |
| | 5 | 8 (Irg. 127) | | | 4 (Darocure 1173) |
| | 6 | 8 (Irg. 127) | | | 4 (Irg. 184) |
| | 7 | | 3 (Irg. 369) | 5 (Irg. 819) | |
| | 8 | | 5 (Irg. 369) | 5 (Irg. 819) | |
| | 9 | | 6 (Irg. 369) | 6 (Irg. 819) | |
| | 10 | | 3 (Irg. 369) | 5 (Irg. 819) | 4 (Darocure 1173) |
| | 11 | | | 4 (Irg. 819) | 4 + 4 (Irg. 651 + Irg. 184) |

The photo-polymerization initiators used are presented below:

Irg. 127: "IRGACURE® 127" (α-hydroxyketone-based photo-polymerization initiator produced by Ciba Specialty Chemicals);

Irg. 819: "IRGACURE® 819" (an acyl phosphine oxide-based photo-polymerization initiator by Ciba Specialty Chemicals);

Luc. TPO: "Lucirin TPO" (an acyl phosphine oxide-based photo-polymerization initiator produced by BASF);

Irg. 907: "IRGACURE® 907" (an α-aminoketone-based photo-polymerization initiator by Ciba Specialty Chemicals);

Irg. 651: "IRGACURE® 651" (a benzylmethylketal photo-polymerization initiator by Ciba Specialty Chemicals);

Darocure 1173: "Darocure 1173" (an α-hydroxyketone-based photo-polymerization initiator by Ciba Specialty Chemicals);

Irg. 369: "IRGACURE® 369" (an α-aminoketone-based photo-polymerization initiator by Ciba Specialty Chemicals); and Irg. 184: "IRGACURE® 184" (an α-hydroxyketone-based photo-polymerization initiator by Ciba Specialty Chemicals)

The above-prepared ink of each color was evaluated by way of the curability test as described below.

[Method of Curability Test]

Polycarbonate plates of 50 mm×50 mm were coated with each ink by way of the spin-coating method to form coating films about 6 μm thick and 2 μm thick, respectively, and were then UV-irradiated with a conveyor-type UV irradiator. Their curability was compared by inspecting the times of the irradiation pass in which the coating film was considered to be tack-free by finger-touching.

(Condition of Uv-Irradiation)
Lamp: a metal halide lamp (produced by Japan storage battery Co., Ltd.)
Lamp output: 120 W/cm
Irradiation per one pass: 0.2 J/cm$^2$
Mirror: a converging-type cold mirror

[Method of Solubility Test]
(Solubility Test at Room Temperature)

The ink composition including no pigments was heated to 60° C., and the photo-polymerization initiator was completely dissolved. Then, the mixture was stored at 20° C. for fourteen days, and whether a precipitate of the photo-polymerization initiator was present or not was visually checked.
Good: no precipitate was present;
Fair: a small amount of the precipitate was present; and
Poor: a large amount of the precipitate was present (easily recognized).

The results are shown in Tables 3 and 4.

TABLE 3

| | | Photo-polymerization initiator of the general formula (1) | α-Aminoketone-based photo-polymerization initiator | Acyl phosphine oxide-based photo-polymerization initiator | Other photo-polymerization initiators | Color of ink | Curability 6 μm | Curability 2 μm | Solubility Room temperature (20° C.) | Others |
|---|---|---|---|---|---|---|---|---|---|---|
| Example | 1 | 6 (Irg. 127) | 4 (Irg. 907) | | | Y | 1 | 2 | Good | Odorous |
| | | | | | | M | 1 | 2 | Good | |
| | | | | | | C | 1 | 2 | Good | |
| | | | | | | B | 2 | 3 | Good | |
| | | | | | | W | 2 | 3 | Good | |
| | 2 | 6 (Irg. 127) | 4 (Irg. 369) | | | Y | 3 | 2 | Good | Colored |
| | | | | | | M | 2 | 2 | Good | |
| | | | | | | C | 1 | 2 | Good | |
| | | | | | | B | 2 | 2 | Good | |
| | | | | | | W | 1 | 3 | Good | |
| | 3 | 8 (Irg. 127) | | 2 (Irg. 819) | | Y | 2 | 2 | Good | |
| | | | | | | M | 2 | 2 | Good | |
| | | | | | | C | 1 | 2 | Good | |
| | | | | | | B | 1 | 2 | Good | |
| | | | | | | W | 2 | 2 | Good | |
| | 4 | 8 (Irg. 127) | | 2 (Luc. TPO) | | Y | 2 | 2 | Good | |
| | | | | | | M | 1 | 3 | Good | |
| | | | | | | C | 1 | 2 | Good | |
| | | | | | | B | 1 | 3 | Good | |
| | | | | | | W | 2 | 3 | Good | |
| | 5 | 5 (Irg. 127) | | 5 (Luc. TPO) | | Y | 2 | 3 | Good | |
| | | | | | | M | 2 | 3 | Good | |
| | | | | | | C | 2 | 3 | Good | |
| | | | | | | B | 2 | 3 | Good | |
| | | | | | | W | 3 | 4 | Good | |
| | 6 | 8 (Irg. 127) | 1 (Irg. 907) | 3 (Luc. TPO) | | Y | 1 | 1 | Good | |
| | | | | | | M | 2 | 2 | Good | |
| | | | | | | C | 1 | 1 | Good | |
| | | | | | | B | 2 | 2 | Good | |
| | | | | | | W | 1 | 2 | Good | |
| | 7 | 9 (Irg. 127) | 1 (Irg. 907) | 2 (Irg. 819) | | Y | 1 | 1 | Good | |
| | | | | | | M | 1 | 2 | Good | |
| | | | | | | C | 1 | 1 | Good | |
| | | | | | | B | 2 | 2 | Good | |
| | | | | | | W | 2 | 2 | Good | |

TABLE 4

| | | Photo-polymerization initiator of the general formula (1) | α-Aminoketone-based photo-polymerization initiator | Acyl phosphine oxide-based photo-polymerization initiator | Other photo-polymerization initiators | Color of ink | Curability 6 μm | Curability 2 μm | Solubility Room temperture (20° C.) | Others |
|---|---|---|---|---|---|---|---|---|---|---|
| Comparitive Example | 1 | 12 (Irg. 127) | | | | Y | 2 | 6 | Poor | |
| | | | | | | M | 2 | 5 | Poor | |
| | | | | | | C | 2 | 4 | Poor | |
| | | | | | | B | 3 | 5 | Poor | |
| | | | | | | W | 2 | 6 | Poor | |
| | 2 | 3 (Irg. 127) | 7 (Irg. 907) | | | Y | 2 | 2 | Good | Strongly odorous |
| | | | | | | M | 2 | 3 | Good | |
| | | | | | | C | 1 | 2 | Good | |
| | | | | | | B | 2 | 4 | Good | |
| | | | | | | W | 2 | 5 | Good | |
| | 3 | 3 (Irg. 127) | | 7 (Luc. TPO) | | Y | 2 | 5 | Good | |
| | | | | | | M | 3 | 7 | Good | |
| | | | | | | C | 2 | 5 | Good | |
| | | | | | | B | 2 | 8 | Good | |
| | | | | | | W | 4 | 12 | Good | |
| | 4 | 8 (Irg. 127) | | | 2 (Irg. 651) | Y | 2 | 3 | Good | |
| | | | | | | M | 3 | 5 | Good | |
| | | | | | | C | 1 | 4 | Good | |
| | | | | | | B | 1 | 4 | Good | |
| | | | | | | W | 3 | 6 | Good | |
| | 5 | 8 (Irg. 127) | | | 4 (Darocure 1173) | Y | 3 | 11 | Good | |
| | | | | | | M | 2 | 10 | Good | |
| | | | | | | C | 2 | 11 | Good | |
| | | | | | | B | 3 | 12 | Good | |
| | | | | | | W | 4 | 13 | Good | |
| | 6 | 8 (Irg. 127) | | | 4 (Irg. 184) | Y | 1 | 3 | Good | Slightly odorous |
| | | | | | | M | 1 | 5 | Good | |
| | | | | | | C | 1 | 3 | Good | |
| | | | | | | B | 1 | 4 | Good | |
| | | | | | | W | 2 | 4 | Good | |
| | 7 | | 3 (Irg. 369) | 5 (Irg. 819) | | Y | 3 | 14 | Good | Slightly colored |
| | | | | | | M | 3 | 14 | Good | |
| | | | | | | C | 3 | 12 | Good | |
| | | | | | | B | 4 | 15 | Good | |
| | | | | | | W | 4 | 11 | Good | |
| | 8 | | 5 (Irg. 369) | 5 (Irg. 819) | | Y | 1 | 12 | Fair | Colored |
| | | | | | | M | 1 | 10 | Fair | |
| | | | | | | C | 1 | 13 | Fair | |
| | | | | | | B | 2 | 14 | Fair | |
| | | | | | | W | 2 | 11 | Fair | |
| | 9 | | 6 (Irg. 369) | 6 (Irg. 819) | | Y | 2 | 5 | Poor | Remarkably Colored |
| | | | | | | M | 4 | 5 | Poor | |
| | | | | | | C | 2 | 8 | Poor | |
| | | | | | | B | 3 | 11 | Poor | |
| | | | | | | W | 3 | 7 | Poor | |
| | 10 | | 3 (Irg. 369) | 5 (Irg. 819) | 4 Darocrue 1173 | Y | 2 | 12 | Good | Slightly colored |
| | | | | | | M | 3 | 15 | Good | |
| | | | | | | C | 2 | 15 | Good | |
| | | | | | | B | 2 | 16 | Good | |
| | | | | | | W | 6 | 18 | Good | |
| | 11 | | | 4 (Irg. 819) | 4 + 4 (Irg 651 + Irg. 184) | Y | 2 | 6 | Good | Slightly odorous |
| | | | | | | M | 3 | 7 | Good | |
| | | | | | | C | 2 | 6 | Good | |
| | | | | | | B | 2 | 8 | Good | |
| | | | | | | W | 11 | 16 | Good | |

It was noticeable that the UV-curable ink-jet printing inks of Examples 1 to 7 exhibited excellent curability in either the thin film of 2 μm or the thick film of 6 μm regardless of the type of coloring agent incorporated therein. Regarding the evaluation of the curability, the ink was considered to have no faults for practical use in terms of the curability when the times of irradiation required for curing each of the inks were 4 or less. The ink of Example 1 contained 40% by mass of Irg. 907, and Example 2 contained 40% by mass of Irg 369. Therefore, an odor was present during the curing time in Example 1, and coloring was present in the coating film obtained in Example 2. Such an odor caused during the curing time can be alleviated by way of aging the coated material. Also, regarding the coloring problem, the compositions can be used by choosing the color tone of the pigment compatible with these compositions, and at least the black or yellow ink has no problems.

Furthermore, as is apparent from Examples 6 and 7, the use of the three-component photo-polymerization initiators in which an α-aminoketone-based compound, and an acyl phosphine oxide-based compound were combined can control such a properties as the solubility, the odor caused during curing time, and the coloring of the coating film, within the range for practical use, and can further increase the amount of the photo-polymerization initiators incorporated therein. In particular, it was found that the curability in the thin film of 2 μm could be most remarkably improved.

As is apparent from Reference Examples 1 and 2, which are shown in Table 5, the compositions of the two-component photo-polymerization initiators of Example 3 or 4 could not improve the curability in the thin coating film in the same manner as in the composition of the three-component photo-polymerization initiators of Example 6 or 7 even if one of or both of the amounts of the photo-polymerization initiators were increased. Moreover, as shown in Reference Example 2, it was evident that further addition of the photo-polymerization initiators reduced the solubility.

about 50% by mass of the photo-polymerization initiators having a strong odor and high coloring property. As shown in Table 4, it can be understood that such compositions easily bring about the coloring of the coating film or unfavorable odor during the curing time.

As shown in Table 3, the photo-polymerization compositions of the present invention in Examples enabled sufficient curing in all colors regardless of a thin or thick film, where all of them could be cured within 4 passes of the UV irradiation, and most of them could be cured within 3 passes, and the compositions exhibited excellent curability for practical use. On the other hand, as shown in Table 4, the inks of Comparative Examples required 5 or more passes of the UV irradiation. In particular, their curability of the thin film was remarkably reduced.

TABLE 5

| | | Amounts of the photo-polymerization initiators used | | | | | | | |
|---|---|---|---|---|---|---|---|---|---|
| | | Photo-polymerization initiator of the general formula (1) | α-Aminoketone-based based photo-polymerization initiator | Acyl phosphine oxide-based photo-polymerization initiator | Other photo-polymerization initiators | Color of ink | Curability 6 μm | Curability 2 μm | Solubility Room temperture (20° C.) | Others |
| Reference Example | 1 | 8 (Irg. 127) | | 4 (Luc. TPO) | | Y | 2 | 2 | Good | |
| | | | | | | M | 2 | 3 | Good | |
| | | | | | | C | 1 | 2 | Good | |
| | | | | | | B | 2 | 2 | Good | |
| | | | | | | W | 2 | 7 | Good | |
| | 2 | 9 (Irg. 127) | | 3 (Irg. 819) | | Y | 1 | 1 | Fair | |
| | | | | | | M | 2 | 2 | Fair | |
| | | | | | | C | 1 | 2 | Fair | |
| | | | | | | B | 1 | 2 | Fair | |
| | | | | | | W | 2 | 5 | Fair | |

On the other hand, as is apparent from Comparative Example 1, in the mere singular use of the photo-polymerization initiator "IRGACURE® 127" (which is represented by the general formula (1), and which is considered excellent in terms of curability in a thin film), there was a limit to the improvement on the curability in the thin film of 2 μm even if the initiator was added to the extent that it precipitated. Particularly, it was realized that the curabilities in the thick film of 6 μm in Comparative Examples 6 and 8, in which no "IRGACURE® 127" was used, were better compared with the case of the single use of "IRGACURE® 127". In Comparative Examples 2 and 3, the amount of "IRGACURE® 127" was reduced to 30% by mass with respect to the total amount of the photo-polymerization initiators, and this resulted in a reduction of the curability in thin film. As is apparent from Comparative Examples 4 to 6, it was confirmed that, in particular, the curability of the thin coating film was insufficient in the case of the photo-polymerization initiator composition where no α-aminoketone-based or acyl phosphine oxide-based photo-polymerization initiator was used in the combined photo-polymerization initiators even if 40% by mass or more of "IRGACURE® 127" was used. Moreover, in Comparative Examples 7 to 11, the curability of conventional photo-polymerization initiator compositions where no "IRGACURE® 127" was incorporated was inspected. However, it was obvious that their curability of the thin films never reached those of Examples. If a photo-polymerization initiator composition having high curability of the coating film is prepared by using only conventional photo-polymerization initiators instead of "IRGACURE® 127", which has less coloring property and is odorless, it is then required to add The active energy ray-curable ink-jet printing ink of the present invention is still more superior than the conventional energy-curable ink-jet printing inks in terms of the odor caused during the curing time, coloring of the cured coating film as well as curability. That is, the addition of about 10% by mass of the photo-polymerization initiators was conventionally required in order to attain favorable curability, and the coloring or odorous problem was somewhat unavoidable. However, the present invention can further solve the odorous problems during the curing time, and coloring problem of the cured coating film while simultaneously maintaining the curability by using 40% by mass or more of the photo-polymerization initiator of the general formula (1) (for example, "IRGACURE® 127" having less coloring property and being odorless) with respect to the total amount of the photo-polymerization initiators. Hereinafter, these differences between the present invention and the conventional composition are explained in detail.

The conventionally-used "IRGACURE® 369" has favorable curability. However, the types of color which can be combined with this compound were limited because a large amount of the compound caused coloring in the cured coating film. On the contrary, excellent curability can be obtained by using the photo-polymerization initiator composition which uses "IRGACURE® 127" in combination even if the amount of the compound is used within the range where coloring of the cured coating film is not present. In particular, it is preferable that a photo-polymerization initiator of the general formula (1), an α-aminoketone-based photo-polymerization initiator, and an acyl phosphine oxide-based photo-polymerization initiator be combined.

(Yellowness of White Ink)

The cured coating films of 6 μm thick of white ink made with photo-polymerization initiators of Examples 6 and Comparative Example 8 were compared in terms of yelowness as described below. The yellowness was measured by using a spectrodensitometer "X-Rite 528" produced by X-rite, and a white PET having optical density of 0.07, and reflectance of 85.1% was used for the background behind the sample.

(Results of Color Measurement)

The cured coating films of the white ink including the photo-polymerization initiator composition of Example 6 exhibited L*=63.47, a*=0.38, and b*=−4.76.

On the other hand, the cured coating films of the white ink including the photo-polymerization initiator composition of Comparative Example 8 exhibited L*=62.99, a*=−2.94, and b*=2.83.

The value b* shows yellowness, and this means that the larger this value is, the more intensive the yellowness becomes. In addition, the value L* represents brightness, and the value a* shows redness when it is positive, and shows greenness when it is negative.

In fact, those used in Comparative Examples 7 to 9 are photo-polymerization initiator compositions disclosed in Patent Document 3, which uses "IRGACURE® 819" and "IRGACURE® 369". It is obvious that the addition of "IRGACURE® 819" and "IRGACURE® 369" should be increased to improve the curability of the thin film, but the increase of "IRGACURE® 369" causes coloring of the cured coating film, and the entire increase of "IRGACURE® 819" and "IRGACURE® 369" further deteriorates the solubility. On the contrary, the above results demonstrate that the photo-polymerization initiator composition of Example 6, which uses 40% by mass or more of "IRGACURE® 127", can produce a much whiter ink cured product.

In addition, as described above, the photo-polymerization initiators having a coloring property to some extent can be used by choosing colors of pigments which can be combined, for example, black, yellow, etc.

"IRGACURE® 907", which has been conventionally used, has favorable curability, but the use of a large amount of this compound causes a strong odor when curing. By aging the cured coating film or by leaving it to stand for a while, the odor of the cured coating film will disappear, and therefore, this does not result in faults in the final coating product. However, regarding the processes of the production, it is preferable that the odor be as little as possible. For example, among the photo-polymerization initiators of the general formula (1), 40% by mass or more of "IRGACURE® 127" is used with respect to the total amount of the photo-polymerization initiators, and the amount of "IRGACURE® 907" which does not cause an intolerant odor during the curing time is added, whereby excellent curability can be obtained. In particular, it is preferable that three-component photo-polymerization initiators of a photo-polymerization initiator of the general formula (1), α-aminoketone-based photo-polymerization initiator, and acyl phosphine oxide-based photo-polymerization initiator be used in combination.

For example, Example 1 and Comparative Example 2 revealed that the combination of "IRGACURE® 127" and "IRGACURE® 907" exhibited excellent curability despite having an odor. With respect to this composition, a part of "IRGACURE® 907" is substituted with an acyl phosphine oxide-based photo-polymerization initiator which has no odorous problem and which exhibits excellent curability in combination with "IRGACURE® 127", whereby the odor at the curing time can be alleviated, the solubility can be maintained within the range for practical use, and the total amount of the photo-polymerization initiator can be increased to achieve further excellent curability.

Hereinafter, it will be further shown that the present invention has excellent solubility and that the present invention can improve the solubility while simultaneously maintaining excellent curability. Furthermore, it will be demonstrated that the active energy ray-curable ink-jet printing ink of the present invention can exhibit excellent curability when the ink is applied to an ink-jet printer which adopts a printing system where an adjoining print head and UV lamp scan through a printing material, ejecting each color of ink thereon, and subsequently conducting UV irradiation after each ejection over the applied inks on the printing material.

Examples 8 to 10 and Comparative Example 12

40 parts by mass of the above-described high-concentration pigment-dispersing solution of the yellow pigment, and a diluted reactive monomer composition for a yellow ink represented in "part by mass" in Table 6 were used therein. Also, the types of photo-polymerization initiators shown in Table 7 were used in the described amounts. With regard to the other procedures, the yellow ink containing the photo-polymerization initiator composition of each Example or Comparative Example was prepared in the same manner as the above-described Examples or Comparative Examples. In addition, "KF-351A" added at 0.2 parts therein is a polyether silicone oil produced by Shin-Etsu Chemical Co., Ltd.

Also, 22.5 parts of the above-described high-concentration pigment-dispersing solution of the black pigment, and a diluted reactive monomer composition for a black ink represented in "part by mass" in Table 6 were used, and the types of photo-polymerization initiators shown in Table 7 were used in the described amounts, whereby black ink including the photo-polymerization initiator composition of each Example or Comparative Example was prepared in the same way.

TABLE 6

| | Diluted reactive monomer composition (other than photo-polymerization initiators) | | | | | |
|---|---|---|---|---|---|---|
| | Epoxy acrylate oligomer | Ethylene oxide adduct of (3 moles) trimethyloipropane triacrylate | Dipropylene glycol diacrylate | Isooctyl acrylate | KF-351A | N-nitrosophenyl-hydroxylamine aluminum |
| Yellow ink | 4 | 20 | 22 | 14 | 0.2 | 0.05 |
| Black ink | 5 | 20 | 38.5 | 14 | 0.2 | 0.05 |
| Magenta ink | 4 | 8 | 31 | 12 | 0.2 | |
| Cyan ink | 5 | 22 | 37 | 16 | 0.2 | |

TABLE 7

| | | Photo-polymerization initiator | | | |
|---|---|---|---|---|---|
| | | Photo-polymerization initiator of the general formula (1) | α-Aminoketone-based photo-polymerization initiator | Acyl phosphine oxide-based photo-polymerization initiator | Other photo-polymerization initiator |
| Example | 8 | 6 (Irg. 127) | 4 (Irg. 369) | | |
| | 9 | 4 (Irg. 127) | 4 (Irg. 369) | | 2 (Irg. 184) |
| | 10 | 5 (Irg. 127) | 3 (Irg. 369) | | 4 (Irg. 184) |
| | 11 | 6 (Irg. 127) | | 4 (Irg. 819) | |
| | 12 | 5 (Irg. 127) | | 3 (Irg. 819) | 2 (Irg. 184) |
| | 13 | 5 (Irg. 127) | | 3 (Irg. 819) | 4 (Irg. 184) |
| Comparitive Example | 12 | | 4 (Irg. 369) | | 6 (Irg. 184) |
| | 13 | | | 4 (Irg. 819) | 6 (Irg. 184) |

Examples 11 to 13 and Comparative Example 13

45 parts by mass of the above-described high-concentration pigment-dispersing solution of the magenta pigment, and a diluted reactive monomer composition for a magenta ink represented in "part by mass" in Table 6 were used therein. Also, the types of photo-polymerization initiators shown in Table 7 were used in the described amounts. With regard to the other procedures, the magenta ink containing the photo-polymerization initiator composition of each Example or Comparative Example was prepared in the same manner as the above-described Examples or Comparative Examples.

Also, 20 parts by mass of the above-described high-concentration pigment-dispersing solution of the cyan pigment, and a diluted reactive monomer composition for a cyan ink represented in "part by mass" in Table 6 were used, and the types of photo-polymerization initiators shown in Table 7 were used in the described amounts, whereby a cyan ink including the photo-polymerization initiator composition of each Example or Comparative Example was prepared in the same way.

Each color of the inks including the above-prepared photo-polymerization initiator compositions was evaluated in terms of the items described below. In addition, regarding the evaluation of the solubility, the solubility at low temperature was also evaluated in addition to the above-described evaluation test of the solubility at room temperature. The curability of the thin and thick films was evaluated based on the following evaluation method. The evaluation method was designed assuming a printing system where an adjoining print head and UV lamp scan through a printing material, ejecting each color of ink thereon, and subsequently conducting UV irradiation after each ejection over the applied inks on the printing material, and form a polychromatic image with a superposition and arrays of the dots of each color. That is, the method can achieve a precise evaluation compatible with either a portion of a thin film or thick film formed by way of such methods of ink-ejection and UV irradiation.

[Method for Evaluating Curability of Thin Film]

Polycarbonate plates (commercial product "Lexan" Asahi Glass Co., Ltd.) were coated with each ink by way of the spin-coating method to form coating films 2 μm thick. Then, they were UV-irradiated at an irradiation energy of 0.08 J/cm$^2$ with a conveyor-type UV irradiator (one metal halide lamp produced by Japan storage battery Co., Ltd.; and lamp output: 80 W/cm), and the times of pass where the surface was no longer damaged by the scuffing test with a nonwoven fabric "Bemcot" produced by Asahi Kasei Corporation were inspected.

[Method of Solubility Test]

(Solubility Test at Low Temperature)

The ink composition including no pigments was heated to 60° C., and the photo-polymerization initiator was completely dissolved. Then, the mixture was stored at −5° C. for fourteen days, and whether the precipitate of the photo-polymerization initiator was present or not was visually checked.

Good: no precipitate was present; and

Fair: a small amount of the precipitate was present;

Poor: a large amount of the precipitate was present (easily recognized).

[Method for Evaluating Curability of Thick Film]

A polycarbonate plate (commercial product "Lexan" produced by Asahi Glass Co., Ltd.) was coated with each ink by way of the spin-coating method to form coating films 2 μm thick and was then UV-irradiated at an irradiation energy of 0.08 J/cm$^2$ (one pass) with a conveyor-type UV irradiator (one metal halide lamp produced by Japan storage battery Co., Ltd.; and lamp output: 80 W/cm). Then, the ink was further coated on the cured film with a spin-coater to form a thickness of 2 μm, and this was UV-irradiated under the same irradiation conditions. By repeating these processes five times, a coating film of about 10 μm thick was produced. This coating film was subjected to UV irradiation under the same conditions, and the number of passes where the surface was no longer damaged by the scuffing test with a nonwoven fabric "Bemcot" produced by Asahi Kasei Corporation was inspected.

[Method for Evaluating Adhesiveness]

The surface of the coating film was incised into a cross with a cutter. The incised part was sealed with cellophanetape (produced by Nichiban Co., Ltd.). Then, the tape was peeled off, and whether the coating film was also peeled or not was visually evaluated as follows:

Good: not peeled;

Fair: partially peeled; and

Poor: completely peeled.

The results of the evaluation are shown in Table 8.

TABLE 8

| | | Amounts of the photo-polymerization initiators used | | | | Curability | | Solubility | | Adhesiveness | |
|---|---|---|---|---|---|---|---|---|---|---|---|
| | | Photo-polymerization initiator of the general formula(1) | α-Aminoketone-based photo-polymerization initiator | Acyl phosphine oxide-based photo-polymerization initiator | Other photo-polymerization initiators | Color of ink | | Room temperture | Low temperture | | |
| | | | | | | | 10 μm | 2 μm | (20°C.) | (−5° C.) | 10 μm | 2 μm |
| Example | 8 | 6 (Irg. 127) | 4 (Irg. 369) | | | Y | 1 | 4 | Good | Fair | Good-Fair | Good |
| | | | | | | B | 1 | 4 | Good | Fair | Good-Fair | Good |
| | 9 | 4 (Irg. 127) | 4 (Irg. 369) | | 2 (Irg. 184) | Y | 1 | 4 | Good | Good | Good | Good |
| | | | | | | B | 1 | 4 | Good | Good | Good | Good |
| | 10 | 5 (Irg. 127) | 3 (Irg. 369) | | 4 (Irg. 184) | Y | 1 | 3 | Good | Good | Good | Good |
| | | | | | | B | 1 | 3 | Good | Good | Good | Good |
| | 11 | 6 (Irg. 127) | | 4 (Irg. 819) | | M | 3 | 5 | Good | Fair | Good | Good |
| | | | | | | C | 3 | 5 | Good | Fair | Good-Fair | Good |
| | 12 | 5 (Irg. 127) | | 3 (Irg. 819) | 2 (Irg. 184) | M | 2 | 5 | Good | Good | Good | Good |
| | | | | | | C | 2 | 4 | Good | Good | Good | Good |
| | 13 | 5 (Irg. 127) | | 3 (Irg. 819) | 4 (Irg. 184) | M | 2 | 4 | Good | Good | Good | Good |
| | | | | | | C | 2 | 4 | Good | Good | Good | Good |
| Comparitive Example | 12 | | 4 (Irg. 369) | | 6 (Irg. 184) | Y | 2 | 7 | Good | Good | Good | Good |
| | | | | | | B | 2 | 7 | Good | Good | Good | Good |
| | 13 | | | 4 (Irg. 819) | 6 (Irg. 184) | M | — | 12 | Good | Good | — | Good |

The inks that used the photo-polymerization initiator of the general formula (1), namely "IRGACURE® 127", had excellent curability in the form of either a thin cured coating film or thick coating film where several thin films were laminated while being UV-irradiated. On the other hand, the inks of Comparative Examples that did not use the photo-polymerization initiator of the general formula (1) had inferior curability particularly in the thin cured coating films. In Comparative Example 13, the curability of the thin film was inferior, and therefore, a thick coating film could not be formed by way of layering with a spin-coater.

There are two UV ink-jet printing systems. One is a UV ink-jet printer in which the entire region is UV-irradiated at a time after the whole coating film whose thickness is partially different is formed. The other is a UV ink-jet printer that adopts a curing method in which each color of ink is discharged, and the discharged spot is subsequently UV-irradiated at every discharging event. Superior curability of the thin film is required in the latter, compared with the former. This is because the ink coating film formed by way of laminating at every discharging event is thinner in the UV ink-jet printer.

When the photo-polymerization initiator of the general formula (1) is combined only with an α-aminoketone-based photo-polymerization initiator or an acyl phosphine oxide-based photo-polymerization initiator (corresponding to compositions of Example 8 or 11), the curability of the thin film depends mainly on, for example, "IRGACURE® 127", and this is why the increase of the initiator is required to improve the curability of the thin film. However, the solubility of "IRGACURE® 127" in UV-curable compositions is not so favorable. Therefore, the extra addition reduces the solubility, and insufficient curing of the deep parts also occurs because the increase of "IRGACURE® 127" increases an amount of UV absorbed at the surface. This deteriorates the adhesiveness of the cured coating films as shown in Example 8 or 11. In particular, the adhesiveness tends to be inferior when the cured coating films are thicker. As demonstrated in Example 9, 10, 12 or 13, the curability of the thin film can be improved by adding 1-hydroxy-cyclohexylphenyl-ketone, which is a photo-polymerization initiator having very excellent solubility in UV-curable compositions although its curability is slightly inferior, without deteriorating the solubility and the adhesiveness of the thick cured coating film to the base material.

INDUSTRIAL APPLICABILITY

The active energy ray-curable ink-jet printing ink of the present invention exhibits excellent curability for practical use regardless of either a thin or thick coating film formed by way of the ink-jet printing method, and the deficiency of curing or nonuniform curing film does not occur in the cured coating. Therefore, the ink is industrially useful.

The invention claimed is:

1. An active energy ray-curable ink-jet printing ink, comprising:

a coloring agent;

a compound having an ethylenic double bond; and a photo-polymerization initiator, wherein the photo-polymerization initiator includes a compound represented by general formula (2):

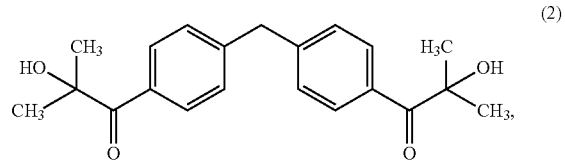

a compound represented by general formula (5) and/or (6):

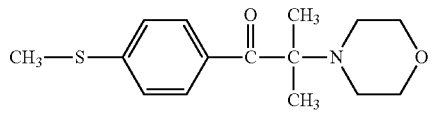
(5)

and
a compound represented by general formula (11) and/or (12):

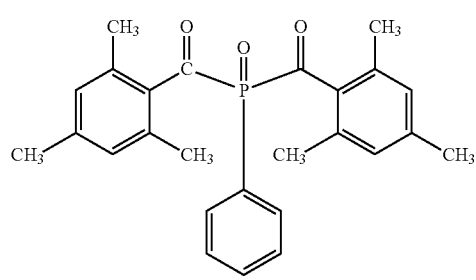
(11)

(12)

wherein the photo-polymerization initiator includes 50% to 80% by mass of the compound represented by general formula (2), 10% to 30% by mass of the compound represented by general formula (5) and/or (6), and 10% to 20% by mass of the compound represented by general formula (11) and/or (12) with respect to the total photo-polymerization initiators;

the total amount of all photo-polymerization initiators is 7% by mass to 15% by mass with respect to the mass of all components of the active energy-ray curable ink-jet printing ink;

and solvent for dilution are not substantially included.

2. The active energy ray-curable ink-jet printing ink according to claim 1, wherein the coloring agent is a white pigment.

3. An active energy ray-curable ink-jet printing ink, comprising:

a coloring agent;

a compound having an ethylenic double bond; and a photo-polymerization initiator, wherein the photo-polymerization initiator includes a compound represented by general formula (2):

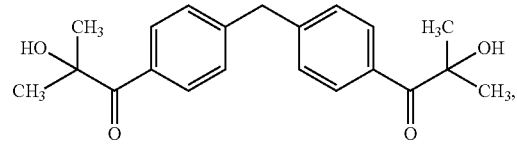
(2)

a compound represented by general formula (5) and/or (6):

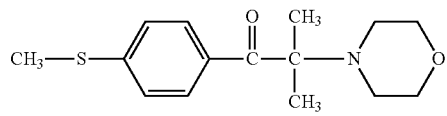
(5)

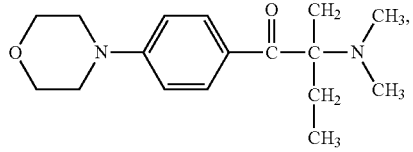
(6)

and
a compound represented by general formula (13):

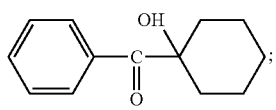
(13)

40% to 80% by mass of the compound represented by general formula (2) is included with respect to the total photo-polymerization initiators;

the amount of the compound represented by general formula (5) and/or (6) is 10% by mass or more with respect to the total photo-polymerization initiators;

the amount of the compound represented by general formula (13) is 10% by mass or more with respect to the total photo-polymerization initiators;

the total amount of all photo-polymerization initiators is 7% by mass to 15% by mass with respect to the mass of all components of the active energy-ray curable ink-jet printing ink; and solvent for dilution are not substantially included.

4. The active energy ray-curable ink-jet printing ink according to claim 3, wherein the coloring agent is a white pigment.

5. The active energy ray-curable ink-jet printing ink according to claim 3, wherein the photo-polymerization initiator includes 50% to 80% by mass of the compound represented by general formula (2) with respect to the total photo-polymerization initiators.

* * * * *